July 6, 1965   L. A. KNOX   3,193,821
MAGNETIC TRANSDUCING APPARATUS
Filed Dec. 31, 1962   2 Sheets-Sheet 1

INVENTOR.
LEWIS A. KNOX
BY
*George J. Potter*
ATTORNEY

United States Patent Office 3,193,821
Patented July 6, 1965

3,193,821
MAGNETIC TRANSDUCING APPARATUS
Lewis A. Knox, Owego, N.Y., assignor to International
Business Machines Corporation, New York, N.Y., a
corporation of New York
Filed Dec. 31, 1962, Ser. No. 248,341
6 Claims. (Cl. 340—347)

The invention relates generally to magnetic transducing apparatus, and more particularly to such apparatus for so-called static sensing of indicia composed of a material having high magnetic permeability which does not require relative movement between the indicia and the apparatus during sensing.

There are a number of different position sensing devices, such as angle digitizers or shaft encoders, for example, which have as their basic operating principle the sensing of areas of a low reluctance magnetic material by a suitable transducing means. Exemplary of such devices is the shaft encoder set forth in the copending United States patent application Serial No. 133,735 filed August 23, 1961, by Lewis Knox. In its major elements, the encoder of the copending application consists of disclike members axially related to a shaft such that rotation of the shaft provides a corresponding rotation of the members. A plurality of precisely dimensioned magnetic areas are arranged on surfaces of the members in equally spaced relation collectively forming paths concentric to the shaft. Magnetic transducers mounted adjacent provide an electric signal each time a magnetic spot moves into operative range, and interpretation of the count of such signals as measured from a reference position provides a determination of present shaft position.

A most important item in such apparatus with respect to accuracy is the magnetic transducing means. Although there are any number of specific forms that these transducers can take, in their most general aspect they comprise a core of magnetic material having a gap therein. An associated driving winding is energized by a suitable electric power source. When a magnetic spot is moved into operative proximity with the gap of the core, the resulting reduction of the total core reluctance results in production of an electric signal by transformer action in a second, or sense, winding carried by the core. It is with particular regard to the detailed structure of a special magnetic transducer of this general type that the invention is most pertinent.

When a magnetic area to be sensed is brought from a remote point to within operative range of such a transducing means, it is highly important to the accuracy of indication that the change from "no-signal" to "signal" be clearly discernible in order to hold associated errors, or uncertainties, in the reading mode to a minimum. In electromagnetic devices of the character referred to, there is a tendency for the magnetic field associated with the gap of the core to be effective for some distance beyond the edges of the gap, which fields are usually termed "fringing" fields. Fringing acts, in a sense, to extend the gap dimensions, which, of course, is reflected as an error in measurement made by the transducer. Certain aspects of the invention are particularly effective in reducing errors arising from this source.

It is not unusual with such apparatus that the size and spacing of the magnetic areas to be sensed are quite small, measured in the thousandths of an inch. This, of course, further complicates the fringing problem. Also, the minute dimensions of the magnetic indicia usually denotes a correspondingly small signal on sensing. Certain other aspects of the invention in the nature of a composite transducer structure effects an enhanced selectivity capability as well as increased signal strength and signal to noise ratio.

It is therefore a primary object of the invention to provide a magnetic transducer for producing an electric signal when in operative proximity to an area of low magnetic reluctance material.

Another object of the invention is the provision of such a transducer having means for substantially reducing fringing fields.

A further object is the provision of a magnetic static sensing transducer having a composite core structure of adjacent alternately different magnetic polarities.

Another object is constructing such a transducer having a drive winding arranged to interleave core laminations.

Yet another object is the provision of a composite core structure where the component core parts have a predetermined mutual spacing permitting direct opposition to certain sense areas while other core parts are simultaneously out of opposition.

A further object is the provision of a static sensing transducer of simpler construction and superior qualities in regard to accuracy of sensing and indicating the positional relation of magnetic sense areas.

The foregoing and other objects, features and advantages of the invention will be apparent from the following more particular description of a preferred embodiment of the invention, as illustrated in the accompanying drawings.

Briefly, through the practice of the present invention there is provided a magnetic transducer comprised of a multi-part core having a single gap which can be disposed during operation in operative relation to areas to be sensed such that they effect magnetic short-out of the gap of a continuously variable degree from some maximum value to some minimum value. A special drive winding is wound on and among the different core parts so as to place adjacent core parts at instantaneously different polarities upon energizing the winding thereby effecting a balanced magnetic circuit. The mutual spacing arrangement of the different core parts is such relative to the spacing of the high magnetic permeability areas to be sensed that while certain of the core parts are operatively related to sense areas (that is, having their respective gaps magnetically shorted) other of the core parts are disposed out of operative relation to the areas (relatively unaffected by any of the sense areas).

In operation, relative movement between the transducer and the sense areas brings these areas successively into and out of magnetic shorting relation with the different core-part gaps causing signals to be produced by transformer action in a sense winding carried by the entire core.

Figure 1:
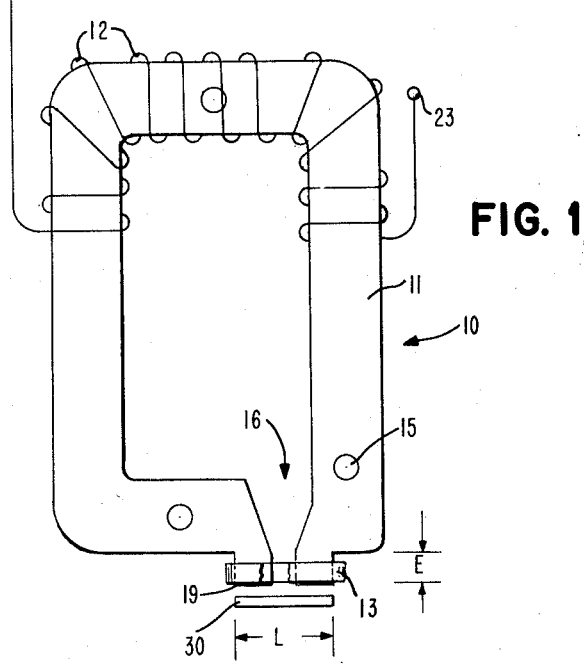
FIGURE 1 is a perspective view of a transducer made in accordance with the practice of the invention as viewed along a line parallel with the sensing gap of its core.

With reference now particularly to FIGURE 1, the transducer of the invention shown in its entirety and indicated generally at 10 is seen to include as its major elements a special core 11, a sense winding 12, and a drive winding 13 interrelated with the core in a specific manner to obtain the superior performance characteristics of the invention.

Figure 2:
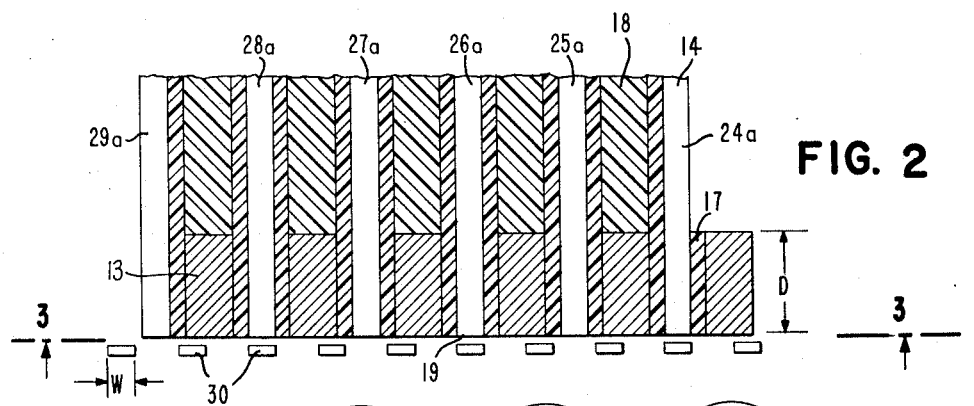
FIGURE 2 is a greatly enlarged fragmentary view of the transducer core in the region immediately adjacent the sensing gap thereof and shown in operative relation to sense areas.

Referring also to FIGURE 2 at this time, the core 11 is formed of a plurality of identically shaped, relatively thin core parts 14 arranged, or stacked, in a face-to-face configuration and secured into an integral structure by suitable conventional fastening means 15 each of which core parts is in turn constructed of thin laminations. As will be more fully brought out later the drive winding 13 is interstitially arranged between the individual core parts of the core in the area immediately adjacent a sensing gap 16, with insulating strips 17 disposed therebetween. Insulative spacers 18 are also provided.

The core parts 14 are of an over-all generally O-shape with a slot, or gap, provided at one point. More precisely, the O-shaped body portion is distended slightly beyond the main body in one area to provide operating portions 19 that define the gap 16. Collectively the outwardly directed ends of the portions 19 are faced-off to form a pair of extended, parallel, substantially flat operating faces, indicated generally in FIGURE 3 at 20 and 21. The insulating strips 17 are of the same over-all dimensions as the individual core parts, or their component laminations. The insulative spacers 18 are of the same general shape without portions corresponding to the operating portions 19.

Although a number of different magnetic materials may be used to construct the core parts 14, depending on the particular use for which the transducer is intended, for present purposes a material composed of 50% iron and 50% nickel has been found to provide optimum results. Also, it is clear that transducers made along the lines described, can be constructed of any convenient size; however, a preferred embodiment was constructed where the core-parts were each composed of four (4) laminations of 0.0007, inch in thickness making each core-part approximately 0.004 inch thick. The insulating strips 17 and spacers were constructed of glass providing good electrical insulation and low magnetic influence properties.

The sense winding 12 (FIGURE 1) is orthogonal to insulated wire arranged in surrounding relationship to the entire core 11, that is about each of the component core parts as a unit, and generally about those portions of the core remote from the sense gap 16. Specifically, with the core construction previously described the sense winding consisted of 300 turns of #41 H.F. copper wire. Output terminals 22 and 23 are provided for making connection to collateral electrical equipment (not shown).

The sense winding 12 (FIGURE 1) is orthogonal to the drive coils, to maintain the balance of this electromagnetic transducer, and to cancel any residual output voltage. Where the size of the transducer permits, a series connection of separate sense windings around individual cores, may be used.

Figure 3:
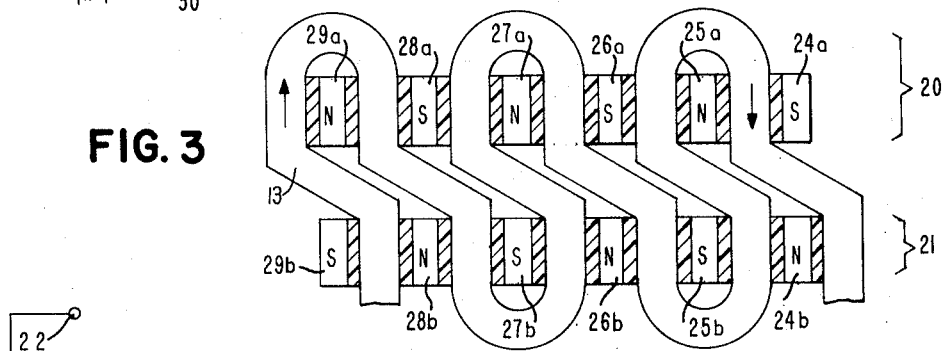
FIGURE 3 is a sectional view taken along line 3—3 of FIGURE 2 particularly showing the association of the transducer composite core structure and its drive windings.

The drive winding 13 construction and winding configuration details are most fully revealed in FIGURES 2 and 3. Constructionally, the drive winding consists of an elongated tape-like member of a good conducting material, such as copper for example. It is contemplated that when wound on the core in a special manner to be described the flat side of the ribbon or tape will abut against the facing surfaces of the insulating strips 17. The width, D, of the drive winding tape is substantially equal to the extension, E, of the operating portions 19 away from the main body of the core 11. In the constructed embodiment, the sense windings were made of copper stripping material 0.0055 inch in thickness by 0.015 inch in width.

The winding 13 is generally threaded about each of the core parts, with each core part corresponding here to a plurality of laminations, and the threading alternating from, say, one portion 19 of a core part in the face 20 to a portion 19 of another core part in the face 21. As best shown in FIGURE 3 the winding precesses in surrounding relationship each time it crosses the gap 16 to encircle an adjacent core part. More particularly, using the notation of $a$ for core part portions 19 in the face 20 and $b$ for those in face 21, and numbering the portions 24 through 29, the path of the winding 13 is from outside $24b$, between $24a$ and $25a$, between $25a$ and $26a$, between $24b$ and $25b$, and so forth. With an assumed alternating electric current passing through the winding in the instantaneous direction indicated by the arrow, each core part has its operating face at the instantaneous magnetic polarity shown. It is important to note that not only are complementary portions 19 of the same core part of different polarities as is to be expected, but also immediately adjacent portions of the same face, 20 or 21, are of different polarity. More will be said on this point later.

It is important at this time to examine the structure of the sense areas 30 and their dimensional relation to the composite core already described. First of all, such areas must be composed of a material having a low magentic reluctance (high magentic permeability) in order that when disposed in shorting relation to the gap of a particular core part they will present a low reluctance path between the faces 20 and 21. The sense areas we are dealing with here have a generally rectangular shape with the length, L, substantially equal to the outside dimensions measured across both faces 20 and 21 (FIGURE 1) and the width, W, of the same order as the thickness of one core part.

In addition, it is important to the proper functioning of the invention that the sense areas 30 be provided with a mutual spacing condition as shown in FIGURE 2. More particularly, when properly arranged for reading, the areas 30 are in a line collinear with the gap 16 and when, say, the core part $24a$ is in registry with an area its immediately adjacent core part $25a$ is out of registry, or midway between adjacent areas 30. Similarly, $26a$ and $28a$ are in registry at this time and $27a$ and $29a$ are out of registry. This relative spacing arrangement of the sense areas and the core part spacing is essential to the proper functioning of the invention, since as will be shown this novel arrangement provides a balanced magnetic circuit reading condition with very precise positional indications. Actually, a sinusoidal voltage signal is provided, the instantaneous magnitude of which indicates the relative position.

Although the particular material of which the sense areas are made is only of indirect importance, as long as the low reluctance requirement is met, satisfactory sense areas or indicial lines for use with the described transducer are obtained by electrodeposited areas of an alloy composed of 50% nickel and 50% iron. Thickness in this case can be of the order of 0.001 inch.

Figure 4:
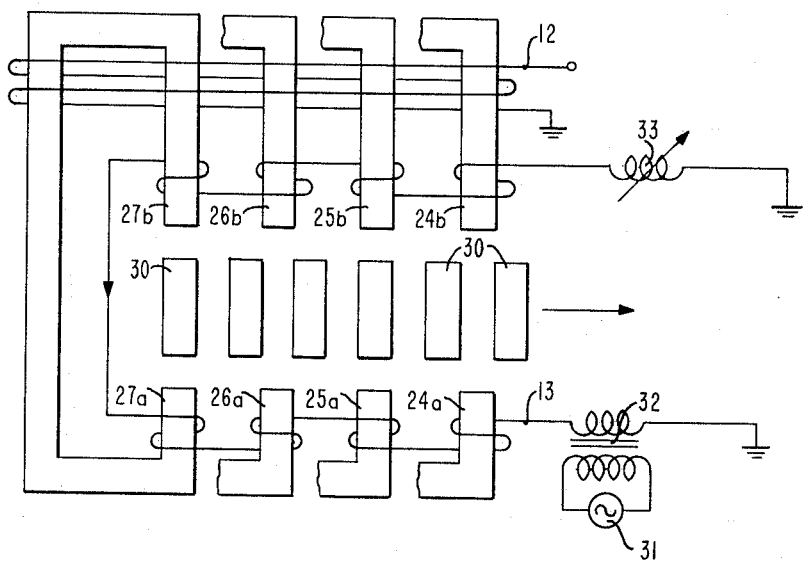
FIGURE 4 is a generalized showing of the transducer in relation to magnetic areas to be sensed for illustrating over-all operation.

For a full understanding of operation reference should now be made to the generalized showing of FIGURE 4. The core parts 14 are shown in exploded fragmentary form with the sense and drive windings 12 and 13, respectively, illustrated in conventional symbology. Power for driving the drive winding is provided from a suitable alternating source 31 via a transformer 32 referenced to ground. The sense areas 30 are arranged in a line parallel to the gap and, for exemplary purposes only, moving in the direction indicated by the arrow. For convenience, the designations used in FIGURE 3 for the operating portions 19 are also used here.

With the instantaneous position of the different parts of the apparatus as in FIGURE 4, core parts 25a–25b and 27a–27b are in the position of maximum transformer action, and thus are contributing a pair of voltage signal components of the same polarity to the sense winding 12 output. Similarly, core parts 24a–24b and 26a–26b are contributing their least possible signals of a polarity opposite to that signal provided by the other two core parts. The difference in polarity between adjacent core parts is because of the special alternating interlacing of the drive winding already described. It might be thought that the contribution of 24a–24b and 26a–26b would be zero, but in actual practice some leakage or fringing occurs here, so that from a position aspect alone some signal exists regardless of the particular relative position of the areas.

Figure 5:
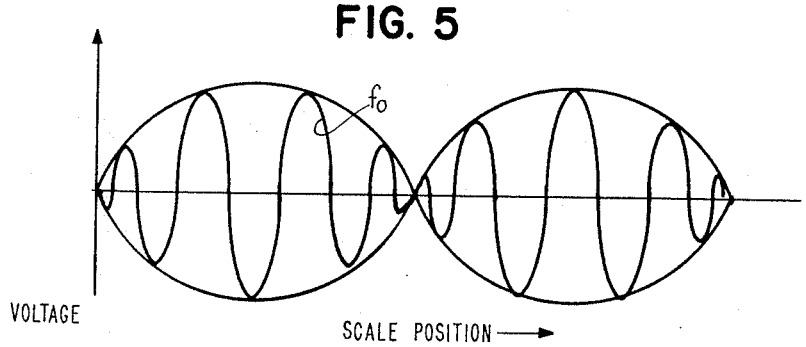
FIGURE 5 is a graph of the sense voltage provided by the transducer.

Movement of the line of sense areas further in the direction of the arrow causes a diminution of the components provided by 25a–25b and 27a–27b with a concomitant increase of the voltage components supplied by 24a–24b and 26a–26b. This total signal is shown in FIGURE 5 where the relative location of the areas to the transducer is the abscissa and the ordinate is the voltage signal magnitude. The total effect is one of "modulating" the basic frequency of source 31, and shown here as $f_o$, by the changing magnetic effect produced by changing the relative positioning of the areas 30. The frequency, $f_o$, should be quite high relative to the modulating frequency (speed of change in location) and here can be considered to be about 250 kilocycles per second.

A selectively variable inductance 33 is interposed serially in the supply line for the drive winding to provide magnitude control where needed.

It is clear that the individual character of the voltage envelope at any particular vertical section (FIGURE 5) is a coded representation of the exact positional relationship of the sense areas relative to the transducer. It must be kept in mind that a unit distance between adjacent areas 30 involves a pair of modulated voltage lobes which amount to a full sinusoidal cycle or period. This will be clear when it is realized that on moving from the position shown in FIGURE 4 to the next position where 24a–24b is in opposed relation to an area 30, there is a point at which the voltage components of opposite polarity are of same magnitude. Accordingly, with reference to a single area, the maximum peaks occur at those times when the area is in full opposing registration and completely out of registration with null points occurring at the one-quarter and three-quarter marks.

Collateral processing and interpreting equipment is necessary to relate particular signal values or swings measured at the sense winding to corresponding positional information. Also, it is necessary to provide a means for indicating the number of sense areas which pass during a given measurement, since obviously most measurements made will not be merely between two adjacent sense areas, but rather will involve a total distance amounting to a multiple of the distance between adjacent areas as well as fractional amounts at the beginning and at the end of the measurement.

It should now be apparent that the objects initially set forth have been accomplished. Of particular importance is the provision of magnetic transducing apparatus with a composite core having an energizing winding specially wound to effect an arrangement of a plurality of alternating individual magnetic poles. When magnetic sense areas are arranged in a mutually spaced condition in accordance with the spacing of the magnetic poles, a voltage signal is provided corresponding to and indicative of the relative disposition of the sense areas to the transducer. This voltage signal is obtained for any relative static disposition of the areas and transducer, and does not require relative movement for the production of such signals as do certain types of prior art devices.

While the invention has been particularly shown and described with reference to a preferred embodiment thereof, it will be understood by those skilled in the art that various changes in form and details may be made therein without departing from the spirit and scope of the invention.

What is claimed is:
1. Transducing means for providing coded electric signals indicative of the relative location of indicia constructed of low magnetic reluctance material, comprising:
   a plurality of single-gapped core parts arranged in a face opposed configuration to form an integral core structure with a single common gap;
   a sense winding arranged to inductively cooperate with the integral core structure;
   a drive winding separately encircling each of the core parts in such manner as to provide adjacent core parts with different magnetic polarities on energization of the drive winding; and
   a source of electric power connected to the drive winding for energizing the same whereby electric signals are transformed into the sense winding of instantaneous magnitude dependent on the degree of proximity and relative location of the indicia to the gap and the corresponding magnetic shorting effect developed in the different core parts by the indicia.

2. A transducing means as in claim 1, in which the drive winding is interposed between the different core parts immediately adjacent the gap and is intertwiningly unitary with the core structure.

3. A transducing means as in claim 2, in which the drive winding consists of a flat copper ribbon, and there is further provided electrical insulation means lying between the core parts and the ribbon.

4. Apparatus for sensing relative physical positioning of a member having a number of precisely dimensioned areas of low magnetic reluctance material arranged on a surface of the member in an equally spaced relation, comprising:
   a multi-piece core structure having a gap, the wall portions of the core material defining said gap being formed into outwardly directed flat operating surfaces, each of said core pieces consisting of a plurality of thin Fe-Ni laminations stacked into a unit;
   a drive winding threaded between the respective core pieces in a configuration to provide differing polarity conditions among the core pieces upon electrical energization of the winding;
   an alternating current source connected to the drive winding for cyclic energization thereof;
   means for providing relative movement between the member carrying the magnetic material areas and the core along a definite path such that said areas pass in close opposed relationship to the operating surfaces, bridging the same, and effecting successive magnetic shorting-out of the gap portions of the core pieces;
   a sense winding wound about the core; and
   interpreting means responsive to the magnitude of electric signals transformed into the sense winding for indicating position of the member relative to a reference.

5. Apparatus for sensing as in claim 4, in which the core structure is substantially U-shaped, the two leg portions having their extremities faced-off to form the operating surfaces; said drive winding alternately passing around the leg portions of the core pieces of the two surfaces.

6. Apparatus for sensing as in claim 4, in which the spacing between adjacent core pieces is equal to three-halves of the spacing between adjacent areas of low magnetic reluctance material.

References Cited by the Examiner
UNITED STATES PATENTS 2,765,459  10/56  Winter _____ 340—347

References Cited by the Applicant
UNITED STATES PATENTS

| | | |
|---|---|---|
| 2,866,013 | 12/58 | Reis. |
| 2,891,236 | 6/59 | Eisenberg. |
| 2,892,041 | 6/59 | Rubens et al. |
| 2,900,451 | 8/59 | Havstad. |
| 2,905,770 | 9/59 | Kornei. |
| 2,926,220 | 2/60 | Camras. |
| 2,927,973 | 3/60 | Geller. |
| 3,013,123 | 12/61 | Camras. |

MALCOLM A. MORRISON, *Primary Examiner.*